United States Patent
Vollmar

[19]

[11] Patent Number: 6,098,847

[45] Date of Patent: Aug. 8, 2000

[54] APPARATUS FOR FEEDING A FLOWABLE PARTICULATE MATERIAL INTO A PROPORTIONING APPARATUS

[75] Inventor: Hartmut Vollmar, Koenigswinter, Germany

[73] Assignee: Mann & Hummel ProTec GmbH, Ludwigsburg, Germany

[21] Appl. No.: 09/135,014

[22] Filed: Aug. 17, 1998

[30] Foreign Application Priority Data

Aug. 16, 1997 [DE] Germany ..................... 297 14 642 U

[51] Int. Cl.[7] ........................................... B67D 5/52
[52] U.S. Cl. .......................................... 222/142; 222/561
[58] Field of Search ........................... 222/77, 138, 142, 222/561

[56] References Cited

U.S. PATENT DOCUMENTS

| | | | |
|---|---|---|---|
| 4,986,456 | 1/1991 | Johanson | 222/561 |
| 5,096,099 | 3/1992 | Wiese | 222/561 |
| 5,148,943 | 9/1992 | Moller . | |
| 5,513,777 | 5/1996 | Yoda et al. | 222/561 |

FOREIGN PATENT DOCUMENTS

| | | |
|---|---|---|
| 22 64 466 | 4/1974 | Germany . |
| 92 14 622 U | 4/1993 | Germany . |
| 297 14 642 U | 10/1997 | Germany . |

*Primary Examiner*—P. Derakshani
*Attorney, Agent, or Firm*—Evenson, McKeown, Edwards & Lenahan, P.L.L.C.

[57] ABSTRACT

A feeding apparatus for feeding at least one ingredient of a free-flowing bulk material to a proportioning apparatus, the proportioning apparatus having a separate hopper scale for each ingredient, the feeding apparatus being disposed above the proportioning apparatus and being composed of a number of assembled modular units corresponding to the number of hopper scales in the proportioning apparatus, each modular unit including an ingredient feed spout and a shutter for opening and closing the spout.

20 Claims, 7 Drawing Sheets

APPARATUS FOR FEEDING A FLOWABLE PARTICULATE MATERIAL INTO A PROPORTIONING APPARATUS

BACKGROUND OF THE INVENTION

The invention relates to an apparatus for feeding one or more ingredients of a free-flowing bulk material to a proportioning apparatus, the proportioning apparatus having a number of hopper scales corresponding to the number of the ingredients, one for each of the ingredients. The hopper scales are disposed above the proportioning apparatus, and a dispensing spout equipped with a shutter to open and close it, is associated with each hopper scale.

Such apparatus are used, for example, on plastic fabricating machines, such as injection molding or extruding apparatus, for the precisely controlled feeding of bulk material. The known feeding apparatus have a supporting plate disposed above the hopper scales, in which are held all feed spouts and shutters for the feeding of a material consisting of individual ingredients. A disadvantage in the known feeding apparatus is that, since the number, arrangement and size of the hopper scales are different and are adapted to the material they feed, an individually fitted supporting plate with corresponding bores for the feed spouts and shutters must be provided for each of the different proportioning apparatus. For one thing, this increases the manufacturing cost of the known apparatus, and on the other hand any eventual change in the material to be fed, and thus in the proportioning apparatus, is possible in many cases only with additional expense, and this undesirably limits the flexibility of such apparatus.

SUMMARY OF THE INVENTION

It is the object of the invention, therefore, to provide an improved apparatus for feeding a free-flowing bulk material to a proportioning apparatus.

Another object of the invention is to provide a feeding apparatus for supplying controlled amounts of flowable particulate materials comprising one or several ingredients.

A further object of the invention is to provide a feeding apparatus for free-flowing bulk material which can be assembled individually from a few individual parts to form the desired feeding apparatus adapted to the particular proportioning apparatus.

It is also an object of the invention to provide a feeding apparatus which can be readily adapted to different proportioning apparatus.

These and other objects have been achieved in accordance with the invention by providing a feeding apparatus for feeding at least one ingredient of a free-flowing bulk material to a proportioning apparatus, wherein the proportioning apparatus has a separate hopper scale for each ingredient, the feeding apparatus being disposed above the proportioning apparatus and comprising a number of assembled modular units corresponding to the number of hopper scales in the proportioning apparatus, each modular unit comprising an ingredient feed spout and a shutter for opening and closing the spout.

The purposes of the invention thus are accomplished by providing feeder units comprising a supporting structure, a feed spout and a shutter, which can be assembled in a modular manner. According to the invention the feeding apparatus is assembled from modular units. Thus it is possible by using similarly constructed units to set up feeding apparatus with different numbers and arrangements of feed spouts for varying numbers of ingredients. In this manner, depending on the number, arrangement and size of the hopper scales in the proportioning apparatus, one or more units for feeding the bulk material, each having a feed spout and a shutter, can be assembled to form the desired proportioning apparatus. The manufacture of the apparatus according to the invention is thereby considerably simplified, and the desired apparatus can be assembled by appropriate selection of the required units. Furthermore, the necessary number of parts for the manufacture of the apparatus of the invention is considerably reduced and the assembly time is shorter, resulting in lower overall production costs. Another important advantage of the invention is that, if the proportioning apparatus is to be altered, it can be modified simply and quickly by inserting units into or removing units from the proportioning apparatus of the invention.

In one preferred embodiment of the invention a central unit and peripheral units are provided as modules, with the peripheral units being attachable to the outer periphery of the central unit. In this manner, an especially compact apparatus can be achieved which is easy to assemble in the desired arrangement, in which the peripheral units are attached in the desired number to the central unit. The central unit can at the same time generally be used alone as a feed spout for bulk materials comprising only a single ingredient.

In accordance with another advantageous embodiment, the supporting structure of the units can be made substantially planar with the feed spout passing perpendicularly through its surface. In this case it is preferred that the supporting structure of the central unit be polygonal, at least triangular with rectilinear sides, the peripheral units being fastened to each side. The sides of the central unit can be either equal or different in length. In the interest of minimizing the number of parts and of promoting interchangeability of the peripheral units it is preferred, however, to make the sides of the central unit equal in length.

Depending on the arrangement and size of the hopper scales of the proportioning apparatus, the units can be equipped with the same or with different sizes of feed spouts to make available the cross section of the feed spout that is required for the filling of the hopper scale. For example, it is possible to arrange the feed spout for a hopper scale in the central unit to receive the main ingredient and the feed spouts for the secondary ingredients in the peripheral units of the apparatus of the invention.

In a further advantageous embodiment of the invention, the supporting structure of the units has a planar floor with continuous side walls around it, in the manner of a box, and the units are fastened at their side walls to one another. The apparatus can be arranged such that each peripheral unit is fastened only to the central unit, or it is alternatively possible for the peripheral units to be fastened to one another.

It is advantageous to provide operating means for the shutters, such as pneumatic cylinders, solenoid valves or the like, inside the box-like supporting structure of the units.

An especially easy to assemble apparatus according to the invention, and one which can also be adapted afterward to modified proportioning apparatus, is achieved if the central unit is equipped with preferably all the supply lines for the means for operating the shutters, and the means for operating the peripheral units can be connected to the supply lines of the central unit.

A sliding plate can be provided, for example, as a shutter to open or close the feed spout of the central or a peripheral unit. It is also, however, possible within the scope of the invention to provide other shutters, such as vacuum-operated choke valves or the like.

To mount the apparatus of the invention above the hopper scales of the proportioning apparatus, strengthened areas may be formed on the floor of the supporting structure of the units above the proportioning apparatus, for the attachment of struts. The struts can then be attached to these strengthened areas, for example with screws. In this manner it is also possible, for example, to produce from a central or also peripheral unit an apparatus according to the invention for feeding a bulk material consisting of only one ingredient into a proportioning apparatus with only one hopper scale, which improves the flexibility of the apparatus and permits a further reduction of the number of parts necessary for the manufacture of the apparatus.

Another embodiment of the invention provides for the side walls of the central unit to extend further downward than the side walls of the peripheral units, and for angle brackets to be affixed to the side walls of the central unit for the attachment of struts. In this manner the apparatus according to the invention can also be mounted above the hopper scales of the proportioning apparatus by means of struts which are fastened by the angle brackets to the central unit, the peripheral units being fastened, for example, along the outer periphery of the central unit.

In a particularly preferred embodiment of the invention, the supporting structure of the central unit is in the shape of a regular octagon, and the supporting structure of the peripheral units is configured substantially as a trapezoid, so that the supporting structures of the peripheral and central unit can be assembled to form a continuous planar surface. In this manner an apparatus according to the invention is created, which has a modular construction, which, if a peripheral unit is fastened to each of the sides of the central unit, will have feed spouts for a total of nine hopper scales of a proportioning apparatus and thus will cover the popular embodiments of proportioning apparatus having one to nine hopper scales, and on the other hand the formation of a continuous surface achieves an advantageous visual impression which is also desirable.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments depicted in the accompanying drawings in which.

DETAILED DESCRIPTION

Figure 7:
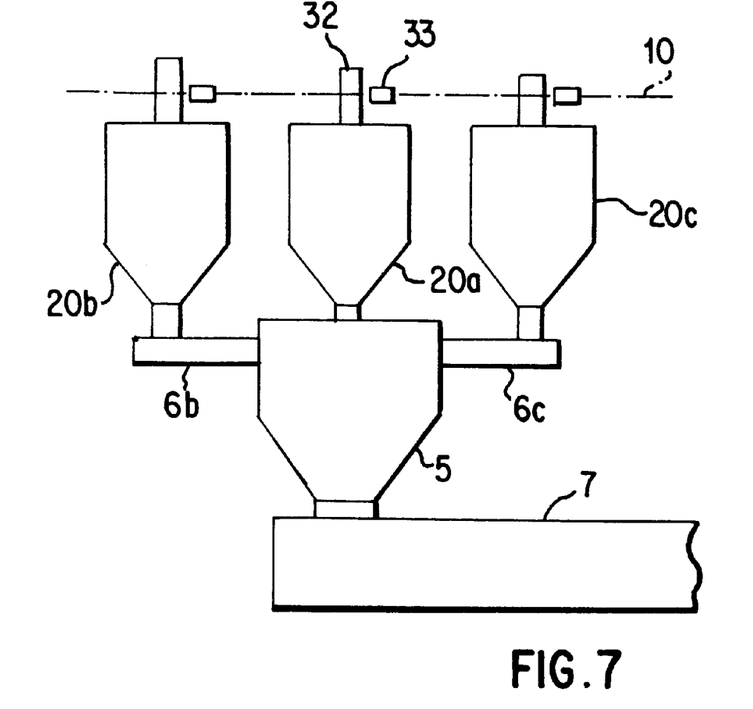
FIG. 7 is a diagrammatic side elevation of a prior art proportioning apparatus.

FIG. 7 illustrates a proportioning apparatus for feeding a bulk material, for example an apparatus for supplying plastic pellets to a plastic fabricating machine such as an extruder 7.

The proportioning apparatus comprises a plurality of hopper scales 20a, 20b and 20c, into each of which one ingredient of the bulk material is weighed, and is transferred either directly or through proportioning screws 6b and 6c to a general hopper 5. The weighed bulk material comprised of the ingredients passes from the general hopper 5 into the extruder 7. The apparatus for feeding the ingredients to the hopper scales is disposed above the scales. To feed the corresponding ingredient into the hopper scales 20a, 20b and 20c, each hopper scale 20a, 20b, 20c, has a feed spout 32 leading into the hopper scale, each feed spout 32 being closed by a sliding shutter 33, illustrated schematically, after the hopper scales 20a, 20b, 20c are filled.

The feed spouts 32 with shutters 33 are held in a supporting plate 10, not shown in detail, which is precisely aligned with the array of hopper scales 20a, 20b and 20c of the proportioning apparatus, and which has a pattern of bores arranged to match the particular proportioning apparatus, so that the feed spouts 32 discharge into the hopper scales 20a, 20b, 20c. The cost of manufacturing such a supporting plate 10 is considerable, due to this individual fabrication, and the adaptation of the supporting plate 10 to modifications of the proportioning apparatus—as for example the addition or removal of a hopper scale when ingredients are changed—is possible only at great expense.

Figure 8:
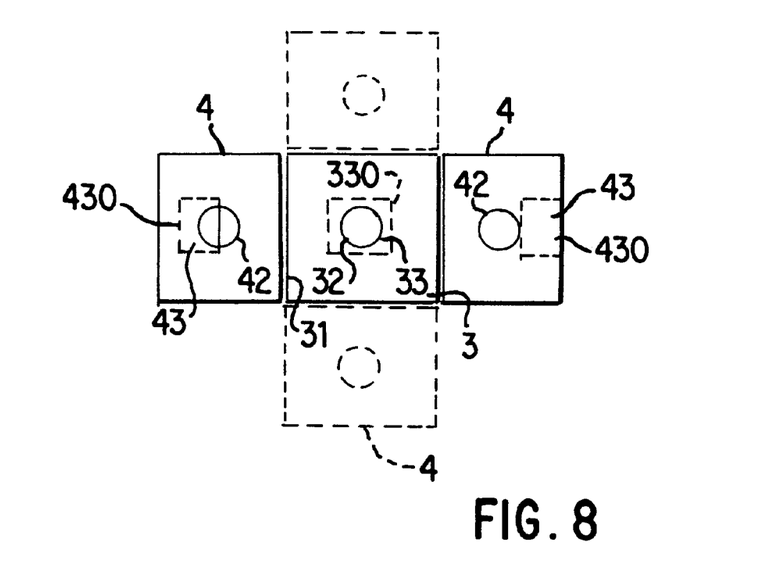
Figure 9:
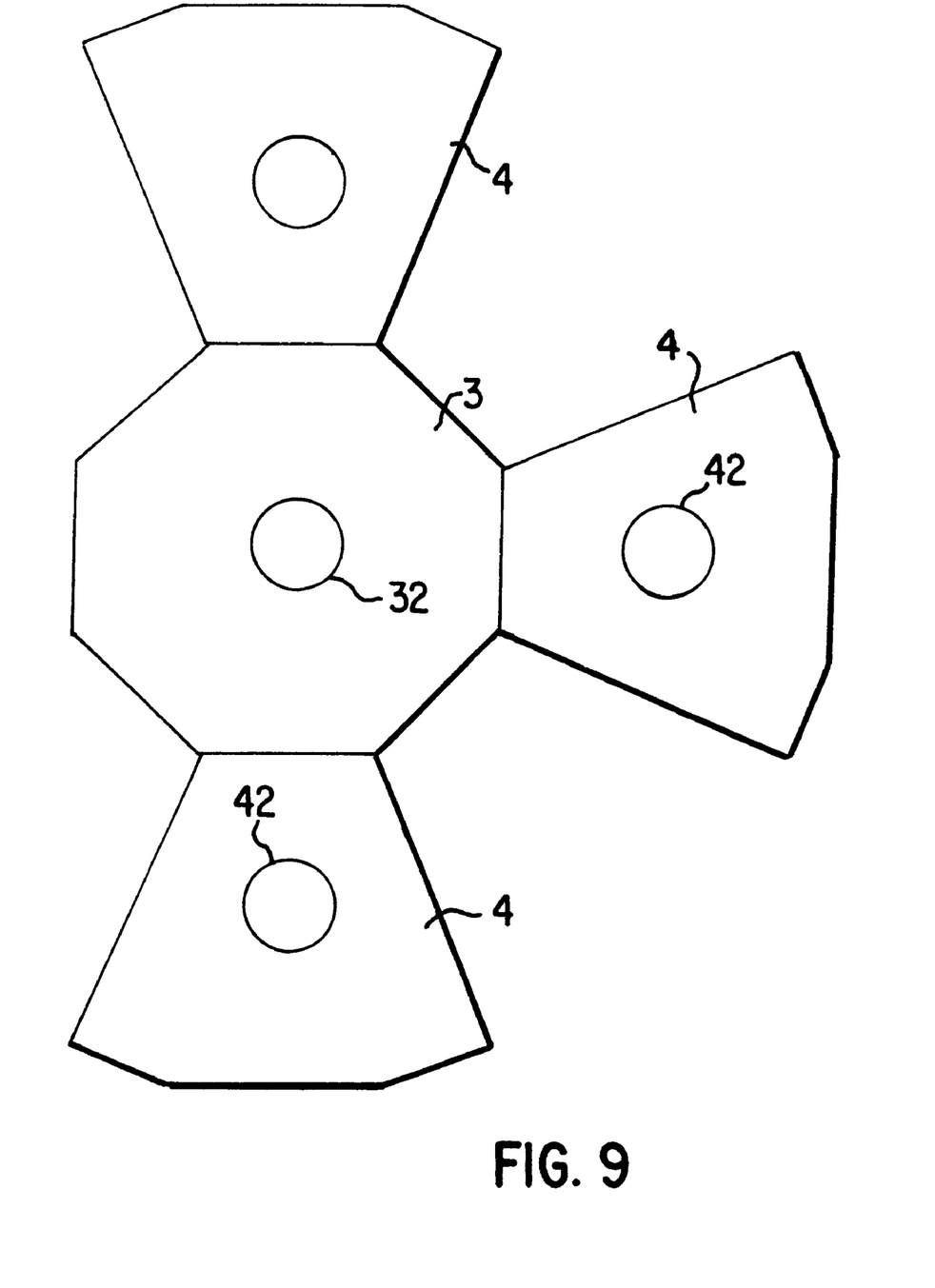
FIG. 9 shows a variation of the feeding apparatus of FIG. 2.

To overcome these disadvantages of the prior art, the apparatus of the invention for feeding a free-flowing bulk material into a proportioning apparatus is constructed as shown schematically, for example, in FIG. 8. The apparatus is composed of a plurality of modular units 3, 4, assembled in the apparatus; one unit being the central unit 3, and the other units being peripheral units 4. Each unit 3, 4, has a flat supporting structure in which are mounted a feed spout 32, 42, and an associated sliding shutter 33, 43 for opening and closing the respective feed spouts 32, 42, by means of a slide plate 430, which is illustrated in FIG. 8 by the shutters 33, 43, being in different open states. One unit 3, 4 serves to feed one ingredient into each individual hopper scale (not shown) of the proportioning apparatus and accordingly is associated with the respective hopper scale.

The central unit 3 has a quadrangular supporting structure with rectilinear sides 31 at its outer periphery, to each of which a peripheral unit 4 is attached, for example, by screws. The apparatus shown in FIG. 8 with two peripheral units 4 fastened to the central unit 3 is designed to feed three ingredients into one hopper scale each. By adding or removing additional peripheral units, as for example the units represented in broken lines in FIG. 8, the feeding apparatus can easily be adapted to proportioning apparatus having more or fewer hopper scales—up to a maximum of five hopper scales in this case. All of the peripheral units are alike as regards their supporting structure. Preferably the peripheral units are also equipped alike, complete with feed spouts and shutters, yet it is also possible to mount feed spouts having differing aperture cross sections on peripheral units with the same supporting structure.

Figure 5:
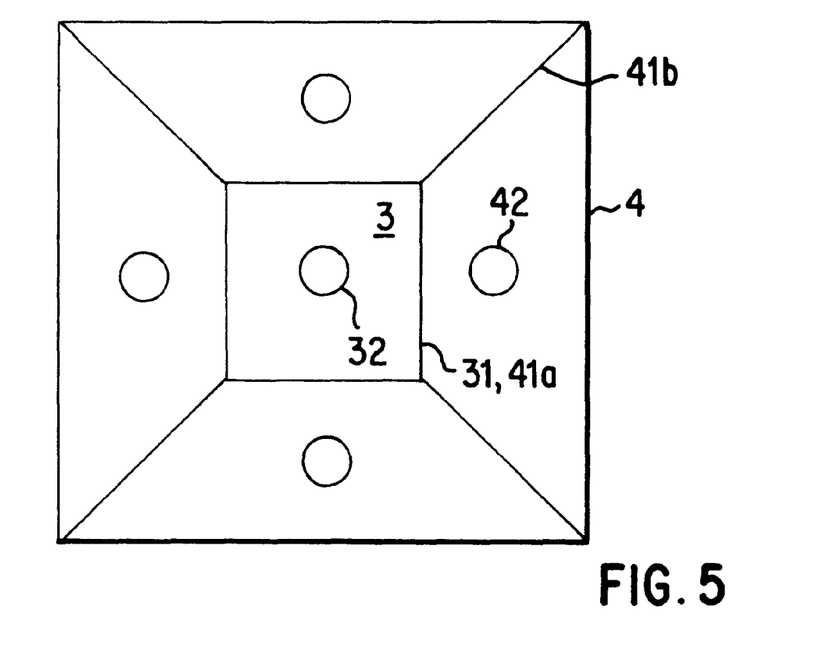
FIGS. 5, 6 and 8 depict various feeding apparatus embodiments composed of units, each having a central unit of square shape.
Figure 6:
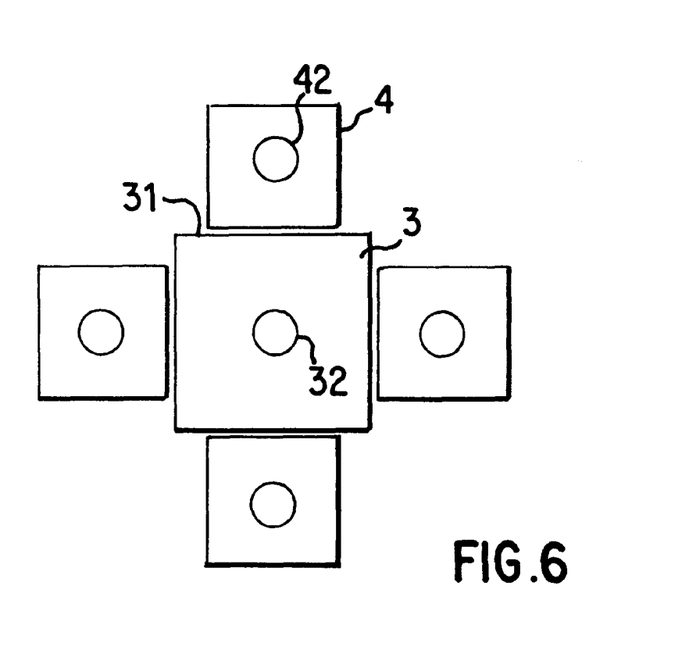

Preferably, the peripheral units 4 are made in such a size that their supporting structure has a side length in the area of connection to the central unit 3 corresponding to the side length of the supporting structure of the central unit 3. It is also possible, however, as shown in FIG. 6, for the peripheral units 4, for example, to have a shorter side length than the central unit 3. However, embodiments are also preferred, as illustrated in FIG. 5, in which the supporting structures of the peripheral units 4 can form a continuous surface with the supporting structure of the central unit 3, which can be achieved by designing peripheral units 4 with a supporting structure in the form of a trapezoid, the central unit being given a square structure, so that the peripheral units 4 are mitered together when fastened to the central unit 3. The central unit 3 should preferably always have the shape of the supporting structure with sides of equal length, such as a triangle, square, pentagon, hexagon, octagon, while the maximum number of the peripheral units, corresponding to the number of sides of the central unit, and having all the same shape of supporting structure, form together with the central unit a continuous supporting surface or form a supporting surface in which the peripheral units are spaced apart from one another laterally.

Figure 1:
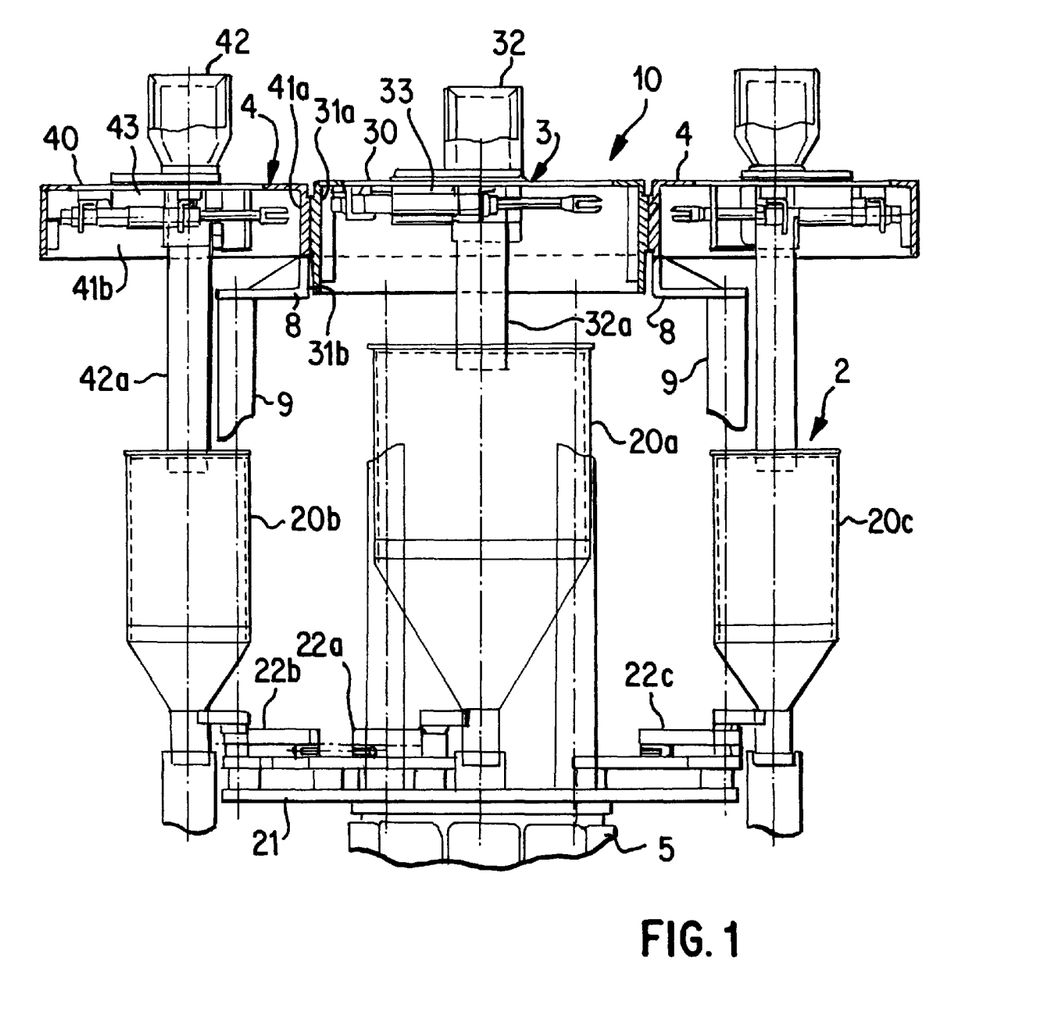
FIG. 1 is a partially sectional side elevation of a proportioning apparatus including a the feeding apparatus composed of units according to the invention.
Figure 2:
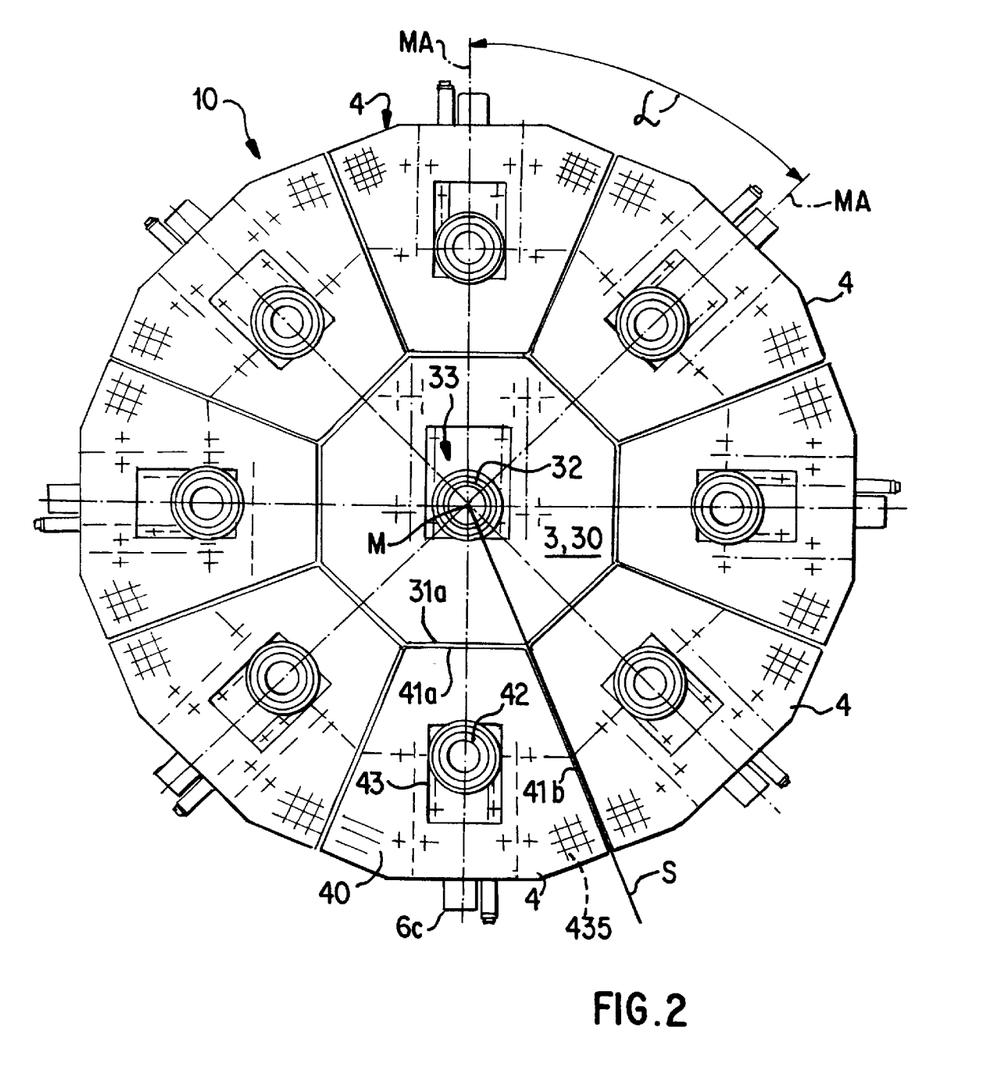
FIG. 2 is a top plan view of the feeding apparatus of FIG. 1.

An embodiment of the apparatus for feeding a maximum of nine ingredients of a free-flowing bulk material into a proportioning apparatus is shown in further detail in FIGS. 1 and 2. As seen particularly in FIG. 1, the proportioning apparatus 2 comprises a supporting plate 21 fastened above a collecting hopper 5, and weighing cells 22a, 22b, 22c are fastened on the supporting plate 21. A hopper scale 20a, 20b, 20c for each ingredient is fastened on each weighing cell 22a, 22b, 22c in a known manner, such that the dispensed ingredients can be weighed out.

To feed particular ingredients into the hopper scales 20a, 20b, 20c, an apparatus 10 is provided which comprises a number of assembled units, namely a central unit 3 and peripheral units 4 fastened to its outer periphery; the number of units corresponding to the number of the hopper scales provided in the proportioning apparatus for the ingredients. The units have a supporting structure with plate-like floor portions 30 and 40, and side walls 31a, 41a,b,c surrounding each floor portion in the manner of a box, the side walls being formed on the side of the floor portions 30 and 40 facing the proportioning apparatus 2.

As shown in particular in FIG. 2, the supporting structure of the central unit 3 has a floor portion 30 in the form of a regular octagon, and a peripheral unit 4 can be fastened on each rectilinear side wall 31a formed between two corners, for example by attaching a side wall 41a by means of screws. In the present embodiment, eight peripheral units 4 are fastened to the central unit 3, so that respective individual ingredients can be fed to a total of nine hopper scales in the proportioning apparatus.

The peripheral units have a supporting structure with a floor 40 which is substantially in the shape of a trapezoid, so that when a total of eight peripheral units are fastened one to each side of the central unit 3, a continuous surface is formed by the supporting structures of the central unit 3 and peripheral units 4.

To feed a particular ingredient into the hopper scales 20a, 20b, 20c, each unit has a feed spout 32, 42, which is extended approximately perpendicularly through the floor area 30, 40, of the central unit 3 and peripheral units 4, and discharges through a tube 32a, 42a, into the particular hopper scale 20a, 20b, 20c.

In the interior of the box-like supporting structures of central unit 3 and peripheral units 4, shut-off slides 33 and 43 are provided as shutters for the feed spouts 32, 42 as described hereinafter.

The apparatus for feeding individual ingredients of the bulk material into the hopper scales 20a, 20b, 20c, which is formed in this manner by a central unit 3 and a plurality of peripheral units 4 fastened to its outer periphery, is mounted by means of struts 9 supported on the supporting plate 21 above the hopper scales 20a, 20b, 20c. For this purpose the side walls 31a of the central unit 3 are constructed so as to extend further down than the side walls 41a of the peripheral units, so that angle brackets 8 can be fastened to the side walls 31a, and the struts 9 can be affixed to brackets 8 to support the apparatus. In this manner it is possible, by mounting up to eight peripheral units 4 on the central unit 8, to provide up to nine hopper scales of the proportioning apparatus with feed spouts for each particular ingredient, so that the number of parts necessary for the various proportioning apparatus with various numbers of hopper scales is considerably reduced, and it is easy to adapt to a greater or lesser number of hopper scales by mounting or removing peripheral units 4 accordingly.

The mounting of the peripheral units 4 on the central unit can be accomplished, for example, by bolting together the side walls 31a and 41a of the supporting structures of central unit 3 and peripheral units 4. In this embodiment, there is no provision for fastening the individual peripheral units 4 together, but of course, this can also be done.

In the embodiment of FIG. 2, all of the peripheral units 4 are constructed alike, with the feed spout 42 of each unit being disposed centrally in the floor 40 of the supporting structure. As a result of the octagonal shape of the supporting structure of the central unit 3 and the substantially trapezoidal shape of the supporting structures of the peripheral units 4, the peripheral units 4 are disposed for attachment to the central unit 3 in such a way that the axes MA of two adjacent peripheral units 4 passing each through the center point of the feed spout 42 and the center point of the feed spout 32 in the central unit 3 are arrayed at an angle $\alpha$ of 45°. Furthermore, extensions S of the side walls 41b of the peripheral units that are formed along the legs of the trapezoid supporting structure of the peripheral units 4 pass through the center point M of the central unit 3, so that the floor areas 30, 40 of central unit 3 and peripheral units 4 form a planar surface slightly interrupted by the seams, which is visually advantageous and prevents damage.

Figure 3:
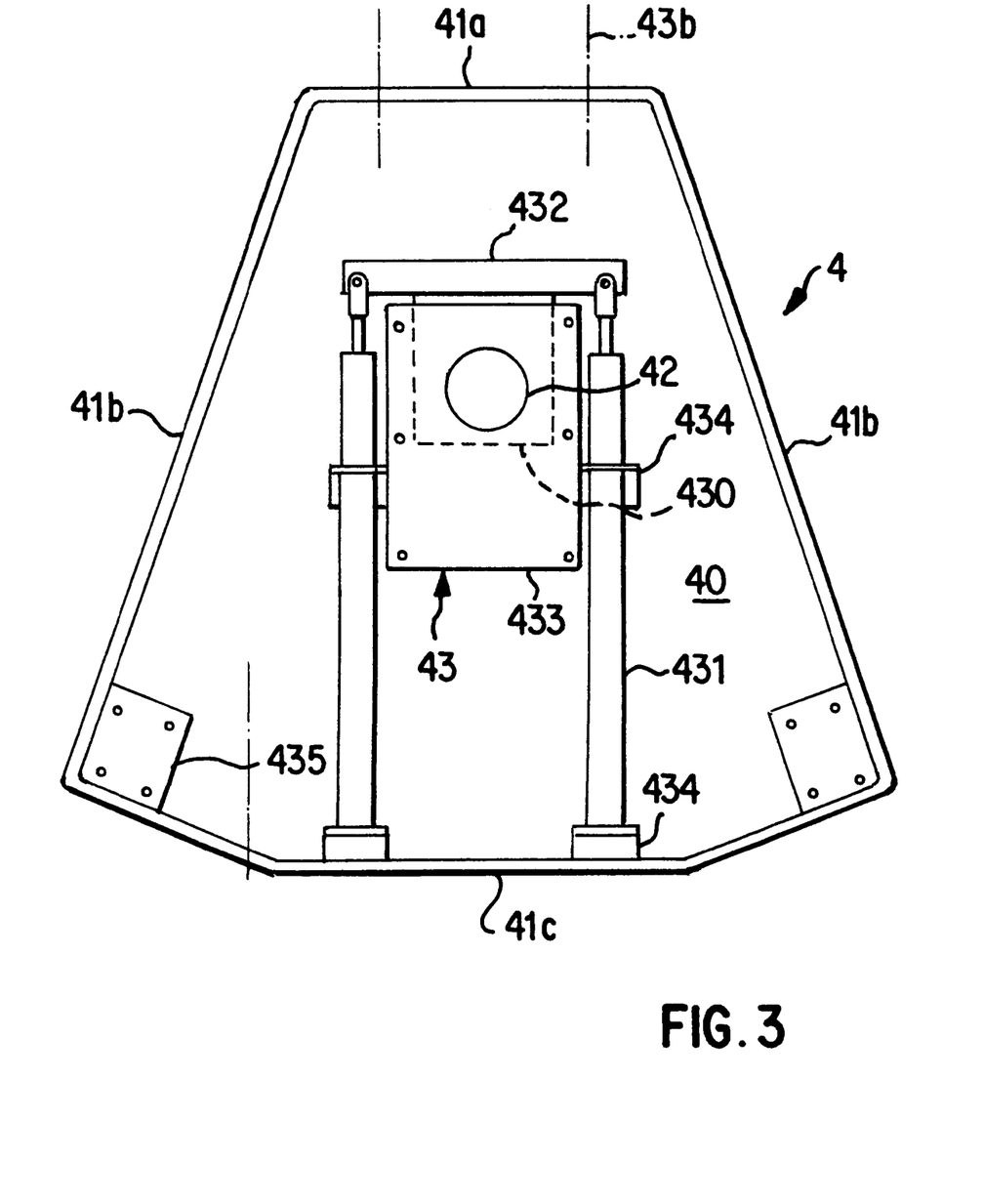
FIG. 3 is an enlarged view of the floor of a peripheral unit of the feeding apparatus of FIG. 2.

The construction of a modular unit is further illustrated in FIG. 3 by a peripheral unit 4. As already explained, this peripheral unit 4 has a supporting structure with a floor 40 and side walls 41a, 41b, 41c surrounding the floor area, the peripheral unit 4 being fastened with its side wall 41a to one side 31a of the central unit 3, with bores 436 being provided in the side wall 41a for bolting to the side wall 31a of the central unit 3.

The spout 42 for feeding the ingredient is extended vertically downward through the floor 40 of the supporting structure, and a sliding shutter 43 is disposed in the interior of the box-like supporting structure consisting of floor 40 and side walls 41a and 41b of the peripheral unit 4. The shutter 43 comprises a sliding plate 430 that opens or closes the cross section of the feed spout 42 and is guided for longitudinal displacement in a housing 433 which is bolted to the floor 40. In order to move the sliding plate 430, a yoke bar 432 is fastened to its one end and is operated by two pneumatic cylinders 431 which are fastened by angle brackets 434 to the floor 40 of the peripheral unit 4, so that the feed spout 42 can be opened and closed. The construction described above provides a unit (in this case a peripheral unit 4) which is equipped with all of the parts needed for feeding the ingredient into a hopper scale, so that the feeding of components into a proportioning apparatus can be accomplished in a simple manner by such units.

The box-like supporting structure of the units 3 and 4 can be enclosed by shielding, such as grilles or the like, so as to prevent damage or injury to the apparatus.

The units described above thus are suitable for the construction of an apparatus for feeding several ingredients into a proportioning apparatus comprising a corresponding number of hopper scales, in that a corresponding number of such units are assembled to form an apparatus 10.

Figure 4A:
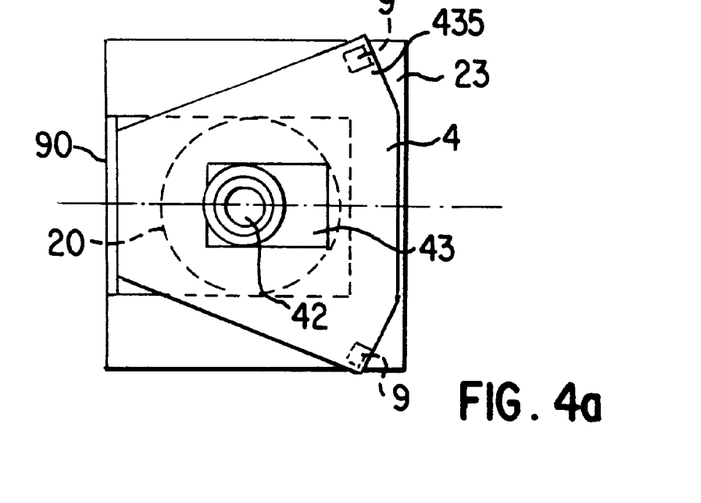
FIGS. 4a and 4b show a feeding apparatus with one unit.
Figure 4B:
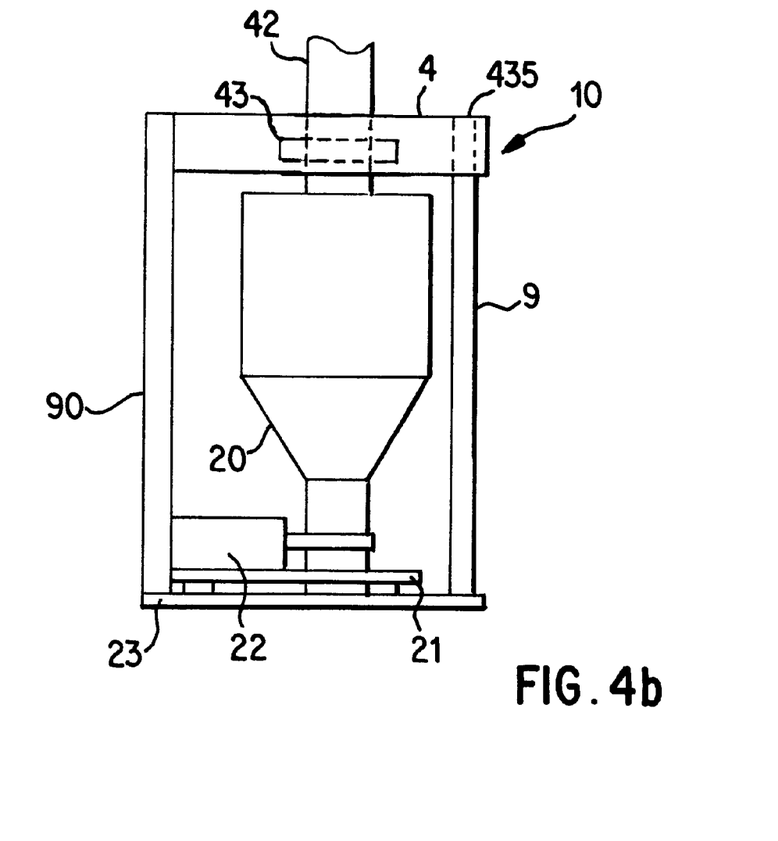

It is furthermore also possible, however, to use one unit, for example a peripheral unit 4, alone in order to feed a bulk material into a proportioning apparatus having only one hopper scale 20, which is depicted in FIGS. 4a and 4b. As can be seen in FIG. 4b, this proportioning apparatus has only one hopper scale 20 which is fastened with its weighing cell 22 on a supporting plate 21. Above the hopper scale 20 a peripheral unit 4 described previously is fastened with its side wall 41a to a supporting beam 90 so that the hopper scale 20 can be filled through the feed spout 42 inserted into the supporting structure of the peripheral unit 4. In order also to support the peripheral unit 4 in the area of its side wall opposite side wall 41a and bear its weight, the peripheral unit 4 has, as seen in FIG. 3, reinforced areas 435 in the corner areas of side wall 41c opposite the side wall 41a, to which supporting posts 9 can be fastened, for example by bolting.

As a result of its modular construction, the apparatus according to the invention therefore makes it possible to produce an apparatus for a proportioning apparatus having a plurality of hopper scales, and it is also possible to create a proportioning apparatus with only one hopper scale, using only one modular unit of the apparatus of the invention. The number of parts necessary for manufacturing the apparatus of the invention is thus kept to a minimum, being limited to a central modular unit 3 and a sufficient number of peripheral units 4.

If, for example, a proportioning apparatus mounted on an extruder or injection molding machine is to be converted to a different product specification, and consequently more or fewer components are needed for the bulk material, a flexible adaptation to the prevailing number of hopper scales can be made by adding or removing peripheral units from the central unit, which requires only a short amount of time.

Likewise it is possible, if the amounts by weight of the ingredients change, to adapt to the necessary changes in the size of the hopper scales by exchanging the corresponding modular units and providing modular units with larger or smaller feed spouts.

For this purpose it is especially preferred to equip the central unit 3 right at the factory with all of the supply lines for supplying power to operate the means for actuating the shutters and to provide the peripheral units with the connections (for example, compressed air lines and valves), so that when each peripheral unit is connected to the central unit, all that needs to be done is to connect the actuating means of the peripheral unit to the line supplying the central unit in order to provide power to the shutter. In this manner the time required for setting up and making changes in the apparatus of the invention is further reduced, which results in cost savings combined with greater flexibility.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A feeding apparatus for feeding at least one ingredient of a free-flowing bulk material to a proportioning apparatus, wherein the proportioning apparatus has a separate hopper scale for each ingredient, said feeding apparatus being disposed above the proportioning apparatus and said feeding apparatus comprising a common supporting frame having a number of assembled modular units corresponding to a number of hopper scales in the proportioning apparatus, each modular unit comprising:

an ingredient feed spout; and a shutter for opening and closing the spout, wherein each of said modular units contributes to the frame of the common supporting structure.

2. A feeding apparatus according to claim 1, wherein said modular units comprise a single central unit having outer peripheral sides and at least one peripheral unit attached to an outer peripheral side of said central unit.

3. A feeding apparatus according to claim 1, wherein each modular unit comprises a unit supporting structure with a substantially horizontally planar surface, and the feed spout of each modular unit extends substantially vertically through the horizontally planar surface of the supporting structure the respective modular unit.

4. A feeding apparatus according to claim 2, wherein said central unit has a polygonal supporting structure with a plurality of rectilinear sides, and each said at least one peripheral unit is attached to a respective one of the rectilinear sides of the central unit supporting structure.

5. A feeding apparatus according to claim 4, wherein the central unit supporting structure has from 3 to 8 rectilinear sides.

6. A feeding apparatus according to claim 4, wherein the central unit supporting structure has a number of sides equal to the number of peripheral units in said feeding apparatus.

7. A feeding apparatus according to claim 4, wherein the central unit supporting structure has a number of sides greater than the number of peripheral units in said feeding apparatus.

8. A feeding apparatus according to claim 3, wherein each modular unit can be equipped with interchangeable feed spouts of differing cross-sectional size.

9. A feeding apparatus according to claim 3, wherein the supporting structures of all of the peripheral units are identical in size and shape.

10. A feeding apparatus according to claim 3, wherein the supporting structure of each modular unit comprises a flat floor area and side walls extending around the floor area to form a box, and said modular units are assembled in that at least one side wall of each modular unit is attached to a side wall of another modular unit.

11. A feeding apparatus according to claim 10, wherein operating means for opening and closing the shutter of each modular unit are arranged inside the box formed by the supporting structure floor and side walls of the respective modular unit.

12. A feeding apparatus according to claim 11, wherein said operating means comprise pneumatic cylinders.

13. A feeding apparatus according to claim 2, wherein each modular unit has a supporting structure comprising a flat floor area and side walls extending around the floor area to form a box, and said modular units are assembled in that a side wall of each peripheral unit is attached to a respective side wall of the central unit.

14. A feeding apparatus according to claim 2, wherein the central unit is equipped with supply lines for a source of power for powering operating means for actuating the shutters of all the modular units, and a shutter operating means on each of the peripheral units is connected to a respective supply line of the central unit.

15. A feeding apparatus according to claim 14, wherein said supply lines are compressed air lines, and said operating means comprise pneumatic cylinders.

16. A feeding apparatus according to claim 1, wherein each shutter comprises a movable plate slidable transversely across the respective feed spout to open or close the spout.

17. A feeding apparatus according to claim 10, wherein on the floor of the supporting structure of each modular unit is provided with reinforced areas facing the proportioning apparatus for attaching supporting struts for supporting the feeding apparatus above the proportioning apparatus.

18. A feeding apparatus according to claim 2, wherein each modular unit has a supporting structure comprising a floor area and side walls extending around the floor area, and wherein the side walls of the central unit extend higher than the side walls of the peripheral units; angle brackets are affixed to the higher portions of the side walls of the central unit, and support struts for the peripheral units are mounted on the angle brackets.

19. A feeder apparatus according to claim 2, wherein the central unit has a support structure with a regular octagon configuration, and each peripheral unit has a support structure with a trapezoidal configuration having a small base equal in length to a side of said octagon and non-parallel sides of equal length; the supporting structures of the central unit and the peripheral units being assembled together to form a continuous surface.

20. A feeding apparatus for feeding at least one ingredient of a free-flowing bulk material to a proportioning apparatus, wherein the proportioning apparatus has a separate hopper scale for each ingredient, said feeding apparatus being disposed above the proportioning apparatus and comprising a number of assembled modular units corresponding to the number of hopper scales in the proportioning apparatus, each modular unit comprising:

an ingredient feed spout; and a shutter for opening and closing the spout, wherein said modular units together comprise a single central unit having outer peripheral sides and at least one peripheral unit, each one of said at least one peripheral unit being attached to a corresponding one of said outer peripheral sides of said central unit.

* * * * *